Nov. 26, 1935.  J. W. H. RANDALL  2,022,479
LAMINATED GLASS
Filed April 20, 1928
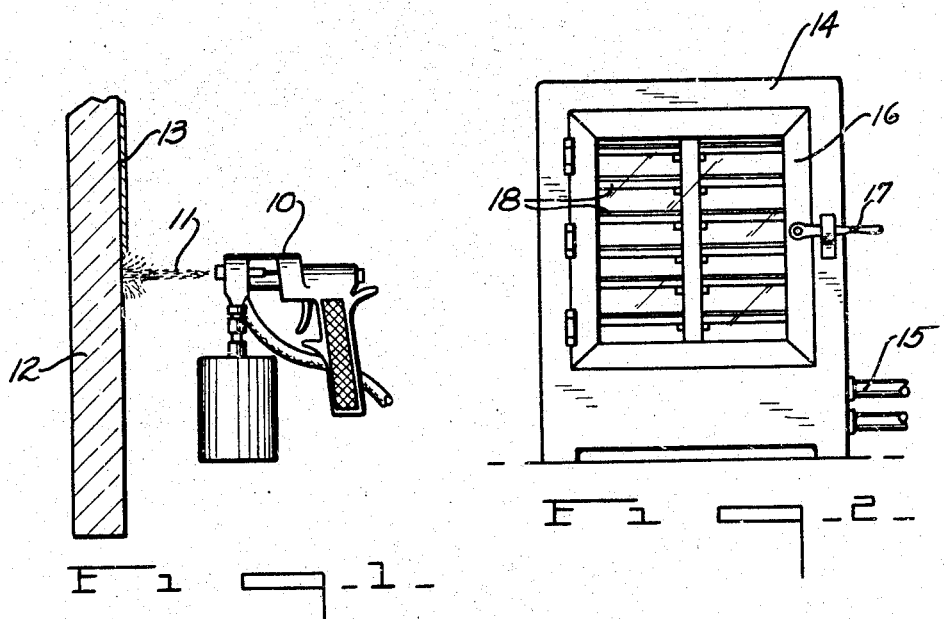
Inventor
James W. H. Randall
By Frank Fraser
Attorney Patented Nov. 26, 1935

2,022,479

UNITED STATES PATENT OFFICE 2,022,479

LAMINATED GLASS

James W. H. Randall, New York, N. Y., assignor to Libbey-Owens-Ford Glass Company, Toledo, Ohio, a corporation of Ohio Application April 20, 1928, Serial No. 271,441

5 Claims. (Cl. 49—81)

The present invention relates to laminated glass and the process of producing the same.

An important object of the invention is to provide a process for producing an improved sheet of laminated glass, which sheet is produced by forming a resin skin on one surface each of two sheets of glass, the skins being allowed to dry to the desired extent, after which a non-brittle membrane is interposed between the resin skin coated surfaces of the glass sheets, and by the aid of a binding liquid such as a suitable solvent the laminations are bonded together preferably under the action of heat and pressure.

Another object of the invention is to produce laminated glass by forming a resin skin and preferably a synthetic resin such as a polyhydric alcohol-polybasic acid resin on one surface each of two sheets of glass, which skins are permitted to dry to the desired extent, after which a non-brittle membrane is interposed between the two skin coated surfaces of the glass sheets, which non-brittle membrane has preferably been treated with a suitable solvent such as dibutyl phthalate, after which the laminations are pressed together to form a composite sheet.

Other objects and advantages of the invention will become more apparent during the course of the following description when taken in connection with the accompanying drawing.

In the drawing wherein like numerals are employed to designate like parts throughout the same, Fig. 1 is a diagrammatic representation of a means forming a resin skin on a sheet of glass, Fig. 2 is an elevation illustrating a cabinet which may be used to dry the skin coating on the glass sheets, Fig. 3 illustrates diagrammatically one method of applying the solvent to a non-brittle membrane, Fig. 4 is a diagrammatic representation of a form of press which may be used to join the laminations together, and Fig. 5 is a fragmentary sectional view through one form of finished product.

The manufacture of laminated glass, which is a term used to designate a composite sheet comprising two or more sheets of glass and one or more sheets of non-brittle material, is extremely difficult. Difficulties arise in obtaining an efficient bond between the various laminations comprising the composite sheet. The quality of the finished sheet is no better than the bond between the laminations, and it is an aim of the present invention to provide a process wherein an excellent bond is obtained so that the laminations will be properly united throughout their entire areas.

Referring to the drawing, in Fig. 1 the numeral 10 designates a spray gun which may be used to apply a spray 11 on a sheet of glass 12. The sheet of glass 12 is preferably transparent and its surfaces may be ground and polished, or not, as desired. The spray 11 leaves a deposit 13 upon the glass sheet, and of course it will be understood that the sheet may be disposed in a horizontal plane or an inclined plane during the spraying operation. Also, the material forming the skin 13 may be applied by means of a brush, a dipping operation, or in any other preferred manner.

The solution that I use to form the coating 13 is a resin solution such as for instance a polyhydric alcohol-polybasic acid resin solution. To produce the solution, the resin is preferably dissolved in a suitable solvent such as acetone. However, the invention contemplates the use of all synthetic resins as a coating material and any or all types of solvents. Obviously, the viscosity of the solution can be controlled by the percentage of solvent used to make the mixture. After the resin solution has been sprayed upon the glass sheet, the glass sheet is placed in a suitable drying cabinet designated by the numeral 14 in Fig. 2. The temperature and humidity of the cabinet 14 can be controlled as desired, and the conduits 15 are provided to facilitate the passage of the controlling medium through the cabinet. A pivoted door 16, held in position by means of a latch 17, may be provided so that the skin coated sheets 18 may readily be placed into and removed from the cabinet 14.

It is preferred that the coatings 13 be permitted to become pretty thoroughly dry, although of course the drying action can be stopped at any desired point to meet conditions. In addition to the use of the types of solvents mentioned, I may add high boiling point solvents or plasticizers such as diethyl phthalate. The drying operation can also be regulated as regards the temperature and time to control the polymerization of the resin. The dried coating of resin material leaves a skin on the sheet of glass, which skin is intimately adhered to the glass. The resin skin has the advantage of having substantially the same index of refraction as ordinary sheet glass.

In Fig. 3 is illustrated a receptacle 19 containing a bath of liquid 20. As shown, a sheet of non-brittle material 21 is being passed through the bath 20 whereby to place a film of the liquid thereon. The non-brittle membrane 21 may be a cellulose ester sheet or it may be a synthetic resin composition. If a cellulose ester sheet is used as the non-brittle membrane, the bath 20 may be a suitable solvent such as dibutyl phthalate. Although it is not absolutely necessary, I prefer to use a solvent which has a relatively high boiling point, low vapor pressure. There are a number of such solvents which can be used, and it is to be understood that I do not wish to be limited to any particular solvent. The solvents herein contemplated are of that stable character in the laminated sheet when the latter is in normal use that the expected or natural decomposition of the tough transparent plastic material incident to the lapse of time and heat and light energy will not be materially accelerated. The solvents possess sufficiently low vapor pressures as to minimize the tendency toward bubbling within the sheet due to a change of state of the bond inducing medium by passing from the liquid to the vapor phase when properly used.

Solvents may be employed within the spirit of the invention as long as they possess the desirable characteristics of stability, high boiling point and low vapor pressure. Esters of phthalic acid, for example, have been found to satisfactorily embody the above characteristics. It is obvious that certain solvents having the characteristics above specified in carrying out the principle of the invention may vary from one another in degrees of high boiling points and low vapor pressures, etc. By way of illustration, in the practice of the invention as herein set forth, the boiling points of the solvents should preferably be above 350° F. and should preferably not exceed one-half the vapor pressure of camphor at ordinary temperatures. Assuming the vapor pressure of camphor to be .4 mm. of mercury at 68° F. or ordinary temperature, the vapor pressure should preferably not exceed .2 mm. of mercury at 68° F. After the non-brittle sheet has been suitably treated with the solvent, it is interposed between two sheets of resin coated glass to produce a sandwich. The sandwich 22 may then be placed in a press, designated in its entirety by the numeral 23, where it may be subjected to the combined action of heat and pressure. If the resin skin is not completely polymerized by this drying heat, the application of heat in the press 23 will give complete polymerization. The solvent used, if it be a relatively high boiling point solvent, has comparatively little action on the non-brittle sheet at the time of application if it be at ordinary room temperatures. This is a desirable condition as such solvents are easily made or rendered active by the elevation of temperature, so that in those cases where heat and pressure are applied to the sandwich the heat used will be sufficient to cause complete polymerization of the resin skin and also to render the solvent active so that it will properly attack the non-brittle sheet and cause a bond or union between the laminations.

I have found that it is easier to obtain a good bond between a resin skin and a sheet of glass than it is between a sheet of cellulose ester and a sheet of glass. Further, I have also found it to be much easier to obtain a bond between a sheet of cellulose ester and a resin surface than between a cellulose ester and a glass surface. One advantage in applying a resin coating or skin to a glass surface is that the resin skin is relatively rough as compared to the surface of an ordinary piece of glass. It is not rough to the extent that it will create or cause distortion in the finished sheet, but nevertheless it is sufficiently rough to cause or permit a proper uniting with the non-brittle membrane.

In some instances it may be desirable to provide a seal on the laminated sheet, and as shown in Fig. 5 the laminated sheet 24 is provided with a suitable seal 25 which will protect the bond between the laminations and the inner lamination from the atmosphere.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. As a new article of manufacture, a sheet of laminated glass consisting of two or more sheets of glass, each sheet of glass having a skin of resin material thereon, and an interposed tough transparent plastic material arranged between the coated surfaces of the glass sheets and treated with a high boiling point, low vapor pressure solvent.

2. As a new article of manufacture, a sheet of laminated glass comprising two or more sheets of glass, a skin of polyhydric alcohol-polybasic acid resin on each sheet of glass, and an interposed tough transparent plastic material treated with a solvent.

3. As a new article of manufacture, a sheet of laminated glass comprising two or more sheets of glass, a skin of polyhydric alcohol-polybasic acid resin on each sheet of glass, and an interposed tough transparent plastic material treated with a high boiling point, low vapor pressure solvent.

4. As a new article of manufacture, a sheet of laminated glass comprising two or more sheets of glass, a skin of polyhydric alcohol-polybasic acid resin on each sheet of glass, and an interposed tough transparent plastic material treated with dibutyl phthalate.

5. As a new article of manufacture, a sheet of laminated glass comprising two or more sheets of glass, a skin of resin on each sheet of glass, the outer surface of the resin being relatively rough, and an interposed tough transparent plastic material treated with a high boiling point, low vapor pressure solvent.

JAMES W. H. RANDALL.